United States Patent
Anghel et al.

(10) Patent No.: US 11,770,084 B2
(45) Date of Patent: Sep. 26, 2023

(54) VOLTAGE REGULATION OF HIGH VOLTAGE DIRECT CURRENT SYSTEMS

(71) Applicant: Honeywell International Inc., Charlotte, NC (US)

(72) Inventors: Cristian E. Anghel, Tucson, AZ (US); Davendar Kashireddy, Bangalore (IN); David C Hodge, Oro Valley, AZ (US); Yonghui Xu, Mississauga (CA); David A Knight, Oakville (CA); Karthik V J, Bangalore (IN); Kumar Sakinala, Bengaluru (IN); Mohan B M, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 46 days.

(21) Appl. No.: 17/586,512

(22) Filed: Jan. 27, 2022

(65) Prior Publication Data
US 2023/0126186 A1    Apr. 27, 2023

(30) Foreign Application Priority Data
Oct. 22, 2021    (IN) .............................. 202111048163

(51) Int. Cl.
*H02P 9/30*    (2006.01)
*H02M 7/06*    (2006.01)
(Continued)

(52) U.S. Cl.
CPC .......... *H02P 9/305* (2013.01); *H02M 1/0009* (2021.05); *H02M 7/06* (2013.01); *H02P 2101/30* (2015.01)

(58) Field of Classification Search
CPC .. H02P 9/305; H02P 2101/30; H02M 1/0009; H02M 7/06
See application file for complete search history.

(56) References Cited

U.S. PATENT DOCUMENTS 4,044,296 A * 8/1977 Dhyanchand ........... H02P 9/305
322/73
4,081,740 A * 3/1978 Teratani ............... H04B 15/025
455/345
(Continued)

FOREIGN PATENT DOCUMENTS

CN    205304664 U    6/2016
CN    108649844 A    10/2018
(Continued)

OTHER PUBLICATIONS

European Patent Office, "Extended European Search Report", from EP Application No. 22202992.8, from Foreign Counterpart to U.S. Appl. No. 17/586,512, dated Mar. 17, 2023, pp. 1 through 13, Published: EP.
(Continued)

*Primary Examiner* — Pedro J Cuevas
(74) *Attorney, Agent, or Firm* — Fogg & Powers LLC

(57) ABSTRACT

Systems and methods for voltage regulation of high voltage direct current systems are provided. In certain embodiments, a system includes a generator that generates alternating current (AC) voltage. The system further includes a power converter that converts the AC voltage into regulated direct current (DC) voltage. Also, the system includes a voltage regulator. In additional embodiments, the voltage regulator includes an AC voltage regulator that regulates the AC voltage generated by the generator. Also, the voltage regulator includes a DC voltage regulator that regulates the DC voltage produced by the power converter. Moreover, the voltage regulator includes a regulator selector that selectively activates one of the AC voltage regulator and the DC voltage regulator based on a current from the power converter and at least one of a voltage of the generator and a voltage of the power converter.

20 Claims, 5 Drawing Sheets

(51) Int. Cl.
*H02M 1/00* (2006.01)
*H02P 101/30* (2015.01)

(56) References Cited

U.S. PATENT DOCUMENTS

| | | | | |
|---|---|---|---|---|
| 4,293,811 | A * | 10/1981 | Muto | H02J 7/163 |
| | | | | 322/73 |
| 5,973,482 | A * | 10/1999 | Meinert | H02P 9/305 |
| | | | | 322/86 |
| 7,193,395 | B2 * | 3/2007 | O'Gorman | H02P 9/48 |
| | | | | 322/89 |
| 7,271,570 | B2 * | 9/2007 | O'Gorman | H02P 9/48 |
| | | | | 322/24 |
| 7,433,211 | B1 * | 10/2008 | Collmeyer | H02M 1/4225 |
| | | | | 363/21.13 |
| 7,548,438 | B1 * | 6/2009 | Collmeyer | H02M 1/4258 |
| | | | | 363/21.13 |
| 7,554,821 | B1 * | 6/2009 | Collmeyer | H02M 1/4225 |
| | | | | 363/21.13 |
| 7,680,613 | B2 | 3/2010 | Lim et al. | |
| 7,888,925 | B2 * | 2/2011 | Dequina | H02M 1/38 |
| | | | | 323/284 |
| 7,990,085 | B2 * | 8/2011 | Furukawa | B60K 6/46 |
| | | | | 318/79 |
| 3,217,631 | A1 | 7/2012 | Owens, Jr. et al. | |
| 8,294,429 | B2 | 10/2012 | Fuller et al. | |
| 9,660,563 | B2 | 5/2017 | Rozman et al. | |
| 10,099,794 | B2 | 10/2018 | Bak et al. | |
| 10,320,314 | B2 | 6/2019 | Fox et al. | |
| 10,583,929 | B2 | 3/2020 | Ozaki | |
| 10,903,743 | B2 * | 1/2021 | Lynch | H02M 3/157 |
| 11,183,941 | B2 * | 11/2021 | Schmitt | H02P 9/305 |
| 11,277,127 | B1 * | 3/2022 | Mantooth | H03K 17/693 |
| 2004/0263131 | A1 | 12/2004 | Suelzle et al. | |
| 2006/0038540 | A1 * | 2/2006 | O'Gorman | H02J 7/24 |
| | | | | 322/28 |
| 2006/0164046 | A1 * | 7/2006 | O'Gorman | H02P 9/48 |
| | | | | 322/28 |
| 2009/0027024 | A1 * | 1/2009 | Dequina | H02M 1/38 |
| | | | | 323/283 |
| 2009/0174188 | A1 | 7/2009 | Huang et al. | |
| 2009/0295333 | A1 | 12/2009 | Ryu | |
| 2011/0133703 | A1 | 6/2011 | Rozman et al. | |
| 2012/0106007 | A1 | 5/2012 | Beneditz | |
| 2018/0316295 | A1 | 11/2018 | Eakman | |
| 2020/0227913 | A1 * | 7/2020 | Lynch | H02H 9/045 |
| 2022/0231615 | A1 * | 7/2022 | Bando | H02K 21/04 |
| 2023/0108847 | A1 * | 4/2023 | Sakawaki | F16C 32/0457 |
| | | | | 318/798 |

FOREIGN PATENT DOCUMENTS

| | | |
|---|---|---|
| CN | 108566129 B | 6/2021 |
| EP | 2131487 B1 | 7/2014 |
| EP | 3772816 A1 | 2/2021 |
| JP | 7072414 B2 | 5/2022 |

OTHER PUBLICATIONS

Noland et al., "Excitation System Technologies for Wound-Filed Synchronous Machines: Survey of Solutions and Evolving Trends", IEEE Access, vol. 7, Aug. 21, 2019, pp. 109699 through 109718.

* cited by examiner

VOLTAGE REGULATION OF HIGH VOLTAGE DIRECT CURRENT SYSTEMS

CROSS-REFERENCE TO RELATED APPLICATIONS

The present application claims benefit of Indian Patent Application Serial No. 202111048163 filed Oct. 22, 2021; the entire contents of the aforementioned patent application is incorporated herein by reference as if set forth in its entirety.

BACKGROUND

For various reasons, aerial and ground vehicles increasingly use electricity to control operations and provide various services. For example, different electrical systems are being added to the vehicles to provide additional features. Also, previously non-electrical systems are being electrified, like using hybrid-electric propulsion systems instead of traditional propulsion systems. Vehicles may include power generators to provide at least a portion of the power used by the various systems.

Further, as aerial and ground vehicles evolve, particularly over the past few decades, so has the demand for electrical systems that enable the functionality of the vehicles. Particularly for aerial and ground vehicles, electrification has resulted in a demand for systems that can produce high voltage direct current (HVDC) at high power levels (i.e., 100 kW or greater).

SUMMARY

Systems and methods for voltage regulation of high voltage direct current systems are provided. In certain embodiments, a system includes a generator that generates alternating current (AC) voltage. The system further includes a power converter that converts the AC voltage into regulated direct current (DC) voltage. Also, the system includes a voltage regulator. In additional embodiments, the voltage regulator includes an AC voltage regulator that regulates the AC voltage generated by the generator. Also, the voltage regulator includes a DC voltage regulator that regulates the DC voltage produced by the power converter. Moreover, the voltage regulator includes a regulator selector that selectively activates one of the AC voltage regulator and the DC voltage regulator based on a current from the power converter and at least one of a voltage of the generator and a voltage of the power converter.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Under common practice, the various described features are not drawn to scale but are drawn to emphasize specific features relevant to the example embodiments.

DETAILED DESCRIPTION

In the following detailed description, reference is made to the accompanying drawings that form a part of the present description and in which is shown, through illustration, specific illustrative embodiments. However, it is to be understood that other embodiments may be used and that logical, mechanical, and electrical changes may be made.

The present disclosure provides systems and methods for voltage regulation of high voltage direct current (HVDC) systems. Power systems may produce direct current (DC) electrical power by converting alternating current (AC) electrical power generated by an AC generator. The present system includes a DC voltage regulator for regulating the voltage of the DC electrical power and an AC voltage regulator for regulating the voltage of the AC electrical power. A regulator selector determines whether to use the DC voltage regulator or the AC voltage regulator by monitoring the voltage of the AC electrical power and the HVDC electrical power. As used herein, the term "high voltage direct current" or "HVDC" means a direct current (DC) potential difference of 270 VDC or greater. Typically, the regulator selector identifies the DC voltage as the point of regulation (POR), namely DC voltage regulator, and selects the AC voltage as the POR, namely AC voltage regulator, based on monitoring HVDC bus voltages and HVDC bus currents. Switching to the AC voltage regulator from the DC voltage regulator based on monitoring HVDC bus voltages and currents stabilizes the generator terminal voltage without oscillations, improves AC line to line peak voltage during the no-load/light load conditions, and improves voltage transients during load-on.

Figure 1:
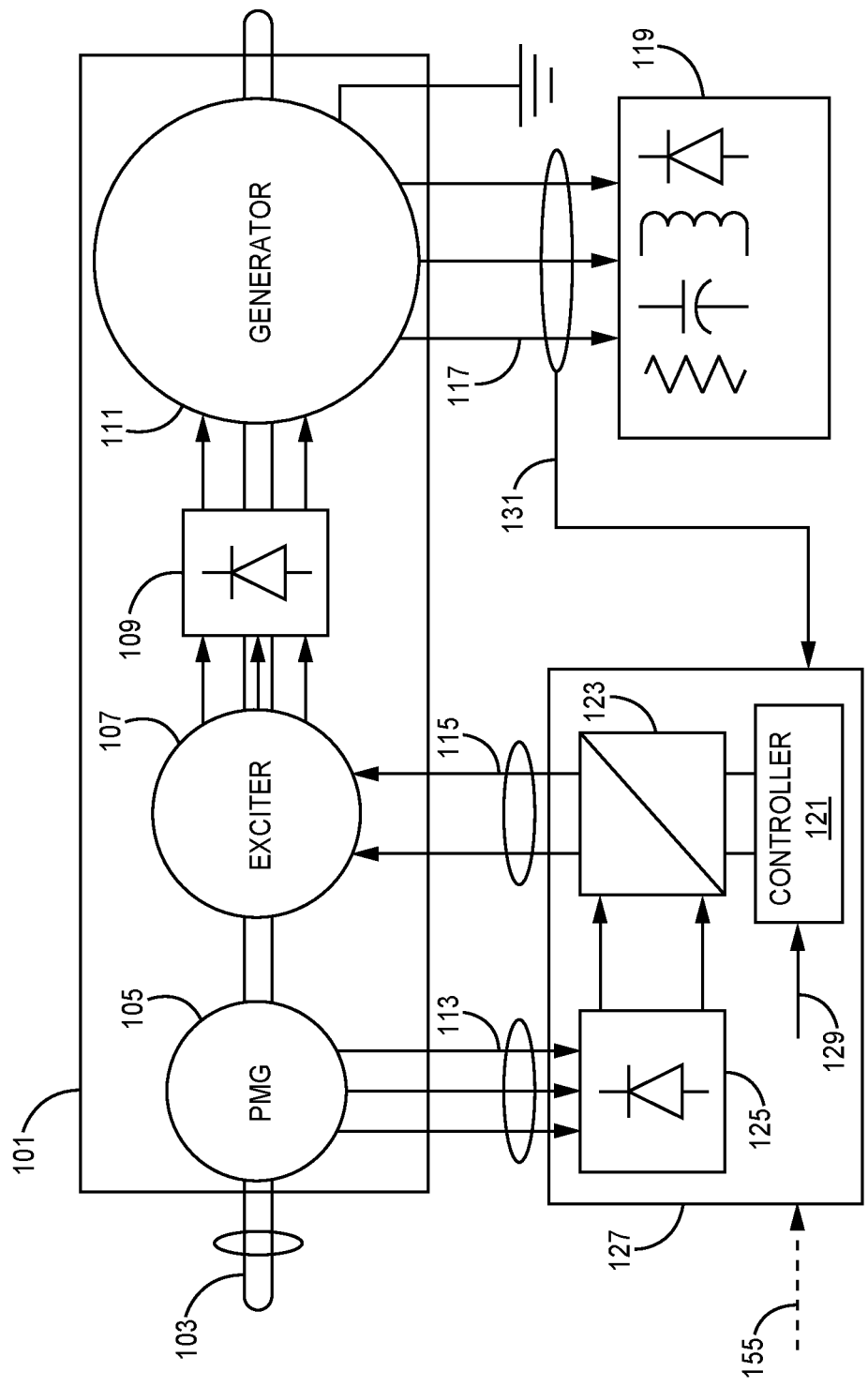
FIG. 1 is a block diagram illustrating a typical system providing alternating current voltage regulation described herein.

FIG. 1 is a block diagram illustrating a typical implementation of a generator system 101. As shown, the generator system 101 may be a brushless AC motor/generator. The generator system 101 may include a permanent magnet generator (PMG) 105, an exciter 107, a main generator 111, a generator control unit (GCU) 127, and one or more rectifier assemblies 109. A generator system, such as that shown as generator system 101, may operate as a starter-generator for a gas turbine engine in aircraft, space, marine, land, or other vehicle-related applications that use gas turbine engines. Also, the generator system 101 may provide electrical power for various other systems found on vehicles or other stationary devices. Some aircraft applications use gas turbine engines for propulsion (e.g., the aircraft's main engines) and/or for power (e.g., the auxiliary power unit (APU)).

When the generator system 101 operates, a shaft 103 rotates the rotor of the PMG 105, the exciter rotor 107, and the main generator rotor 111. In the depicted example, the shaft 103 rotates the PMG 105, the exciter rotor 107, and the main generator rotor 111 along a single axis at the same rotational speed. However, in other embodiments, the PMG 105 may rotate along a different axis with a different rotor. Moreover, the relative positioning of the PMG 105, the exciter 107, and the main generator 111 can be modified in relation to one another.

As illustrated, as the shaft 103 rotates, the PMG 105 generates and supplies PMG AC power 113 to the GUT 127. The GCU 127 may include a rectifier 125 that receives the PMG AC power 113 from the PMG 105 and converts the PMG AC power 113 to DC power. When a PMG 105 is not included in the generator system 101, a separate DC power input 155 can function as a DC power source. The GCU 127 may include a DC controller 123 that is controlled by a controller 121. The GCU 127 may direct the DC controller 123 to provide controllable DC power 115 to a stator of the exciter 107. As the shaft 103 rotates the exciter 107 the exciter 107 may supply AC power to the rectifier assemblies 109. The output from the rectifier assemblies 109 is DC power supplied to power the main generator 111, where the main generator 111 outputs AC power.

During operation, the generator system 101 may output three-phase AC power from the main generator 111. One or more generator output leads 117 may supply the generated AC power to one or more loads 119. As used herein, a load in the one or more loads 119 refers to a system or device that uses electrical power at various frequencies and/or voltages produced by the generator system 101. The GCU 127 can regulate the power output based upon monitoring the voltage and current generated by the main generator 111 through the generator output leads 117 and comparing the voltage and current against a reference voltage 129. The GCU 127 may regulate the AC voltage produced by the main generator 111 at a constant value when subjected to one or more loads 119 or speed variations. When regulating the AC voltage, the GCU 127 may measure the voltages and currents at the AC POR 131 (at the output of the main generator 111) as feedback, and the GCU 127 may use the measurements to control excitation voltages for the main generator 111.

In embodiments of the present disclosure, a power converter converts the AC voltage, generated by systems such as the generator system 101 shown in FIG. 1, to a DC voltage. Systems having a typical GCU (like GCU 127) may not regulate the voltage correctly. For example, some typical systems may generate HVDC with a three-phase AC generator (such as the generator system 101) with diode rectifiers. Other typical systems may generate HVDC with a multi-phase AC generator and diode rectifiers. These generator topologies may be subject to certain problems with DC POR. One problem may include generator voltage instability during voltage buildup with DC POR under no-load conditions. Another problem with DC POR may include voltage overshoot during full load to no load transients, full load to light load transients, or both.

When a system experiences generator voltage instability with DC POR during voltage buildup under no-load conditions, a generator terminal voltage becomes unstable if the DC POR voltage is higher than a DC POR reference voltage. As the system is under a no-load condition, DC bus capacitors may remain charged and keep the voltage at a high value, and the generator terminal voltage may reduce continuously because of action by a generator control unit. During this period, the diodes of a rectifier may be in reverse bias and cause voltage instability.

As stated above, a system may experience DC POR voltage overshoots during full-load to no-load or full-load to light-load transients. The transients caused by the removal or lightening of the load can lead to several issues. For example, when a load is suddenly removed, the DC POR voltage may instantly increase, leading to a DC bus overvoltage because of the load transient. In some examples, when a load is removed, the time to discharge the DC bus voltage to a normal voltage is extended because of DC bus capacitance. Extending the time to discharge can lead to the voltage exceeding voltage transient requirements defined in standards like the MIL-Std-704F or other stated design requirements. Additionally, if the DC bus capacitances are set to small values to meet voltage transient requirements, the DC bus overvoltage amplitude may exceed the overvoltage limit, and a system may experience DC overvoltage faults. Further, the terminal voltage of the generator may decrease because of the actions of a generator control unit, causing a system to be in an unstable state.

Embodiments of the present disclosure address generator voltage instability with a DC POR by monitoring AC power voltages and HVDC bus voltages and currents. For example, systems switch the POR from DC voltage regulation to AC voltage regulation based on the monitoring of the AC power voltages and the HVDC bus voltages. Systems may switch the POR from DC to AC voltage regulation upon detecting either no-load or a light-load during voltage buildup conditions or steady-state operation. Further, during load transients from full-load to no-load or light-load, the GCU may switch the POR to AC voltage regulation based on the monitoring of the HVDC bus voltages and currents. When the GCU switches the POR to AC voltage regulation, a GCU may regulate the generator voltage based on a defined reference voltage that monitors the AC voltages generated by the generator. Swapping the POR from the DC voltage regulation to AC voltage regulation stabilizes the generator terminal voltage without oscillations and improves the performance of the AC line-to-line peak voltage during no-load or light-load conditions and improves the voltage transient during load-on.

In certain embodiments, in addition to swapping the POR from DC voltage to the AC voltages, a generator system may address the transient response during load-off by detecting a load-off transient. When the system detects a load-off transient, the generator system may control a field dump resistor (FDR) and a dynamic break resistor (DBR). The GCU may include the FDR to increase the rate that field energy is dissipated when activated. Additionally, the DBR limits the DC bus overvoltage to bring it back to normal steady-state limits.

The generator system may control the DBR using DBR hardware in conjunction with the GCU. The DBR hardware and/or the GCU may detect an overvoltage and turn on the DBR during a load-off transient. For example, the DBR hardware initially controls the DBR using an overvoltage detection circuit during a load-off transient to limit a DC bus overvoltage. After the initial operation of the DBR hardware control, the GCU may control the operation of the DBR. The initial control of the DBR by the DBR hardware control may reduce the delay on the DBR operation when a load-off transient is detected.

In some embodiments, a DBR power rating may depend on the highest voltage limited by the DBR and on a DC bus capacitor. For example, to meet specific operational requirements (such as the MIL-Std-704f voltage transient requirement), the DC bus voltage should be below the DC voltage limit and should come back to steady-state limits within a specific time period from the instant a load-off transient begins. Once the DC bus voltage returns to steady-state, the DBR hardware or GCU may turn off the DBR. The size of the DBR may be proportional to the duration of the time used to come back from the load-off transient to steady-state.

For example, a faster return to steady-state may permit a smaller DBR size. The reduction of DBR size may provide some advantages in certain applications. Effective control of the DBR allows for reducing a DC bus capacitor rating, permitting a reduction in capacitor size.

In some embodiments, either the DBR hardware or the GCU coordinates the operation of the DBR with the FDR to improve the control of the DC bus voltage. For example, during the operation of the DBR, the FDR may be active, and the pulse width modulation (PWM) of the exciter may be disabled to permit improved control of the DC bus voltage. After the operation of the DBR completes, the FDR can be disabled, and the PWM of the exciter may enter an active state.

Therefore, embodiments described herein are drawn toward systems and methods that enable the regulation of HVDC produced by generators. In particular, systems and methods described herein may help the regulation of the HVDC to achieve defined industry standards.

Figure 2:
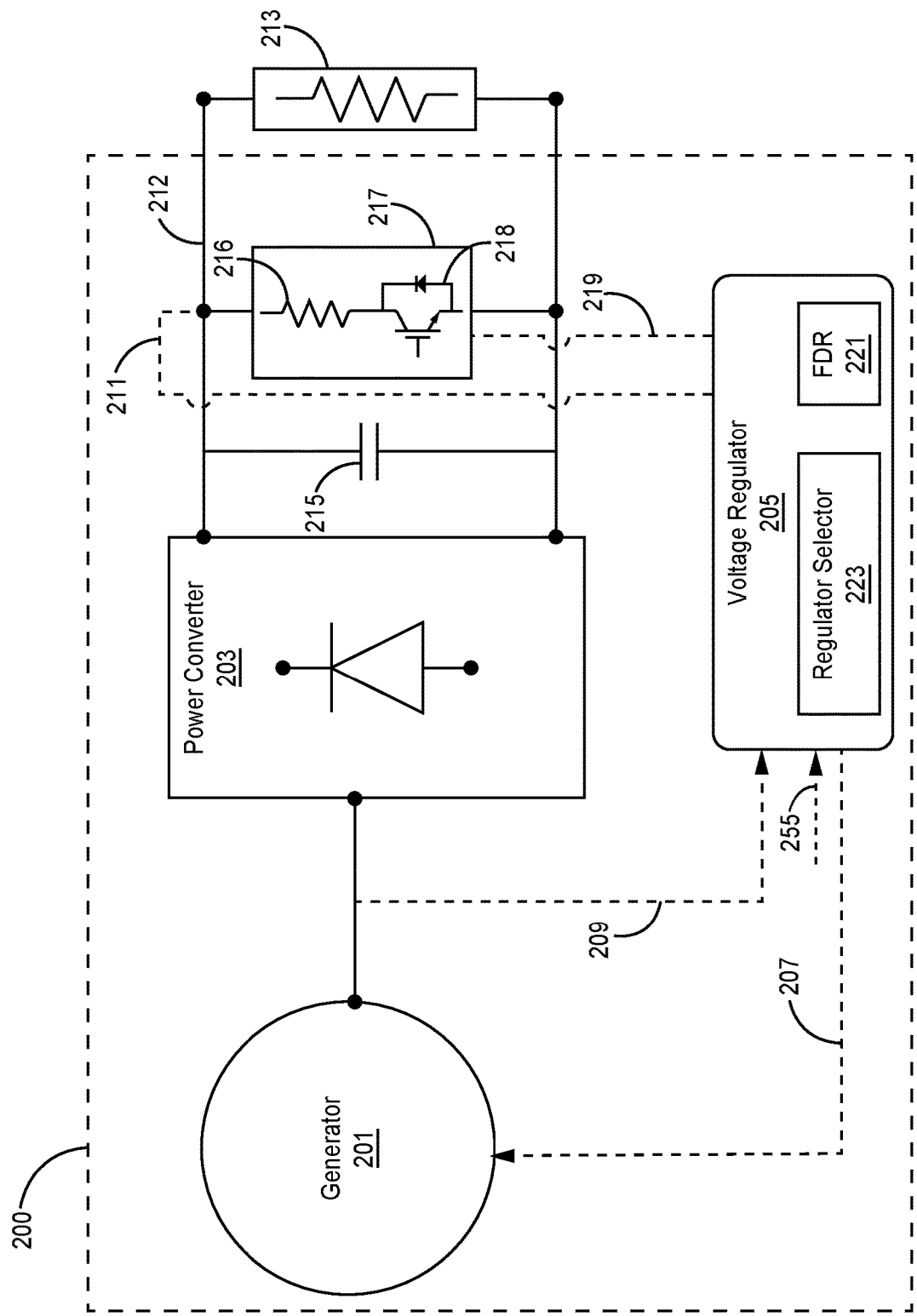
FIG. 2 is a block diagram illustrating a system for voltage regulation of a high voltage direct current (DC) system according to an aspect of the present disclosure.

FIG. 2 is a block diagram of a system 200 that switches the POR between a DC voltage regulator and an AC voltage regulator based on the monitoring of HVDC bus voltages and HVDC bus currents. The system 200 includes a generator 201 and a power converter 203 for converting AC power produced by the generator 201 into DC power. The power converter 203 may be a rectifier, a series of rectifiers, or other suitable device for converting AC power into DC power. The generator 201 may function similar to the generator system 101 described above in FIG. 1. For example, the generator 201 may be a multi-phase generator that produces AC power. In some embodiments, the generator 201 produces three-phase, six-phase, or other number of multi-phase AC power. Further, the generator 201 may include a PMG (such as PMG 105 in FIG. 1) that generates AC power, which is then converted to DC power for the operation of an exciter (such as exciter 107 in FIG. 1). Alternatively, the generator 201 may receive DC power through a DC power input 255.

In certain embodiments, the system 200 may provide DC power to other systems (load 213) coupled to the generator 201. To provide the DC power, the generator 201 provides the generated AC power to a power converter 203, the power converter 203 converts the AC power into DC power, and provides the DC power through a DC bus 212 for use by a load 213. The load 213 may function similar to the one or more loads 119 described above in FIG. 1. The DC bus 212 may have a DC bus capacitor 215 that acts as a capacitance bank for the distribution of DC power to the load 213.

In exemplary embodiments, the system 200 includes a voltage regulator 205 that functions similar to the GCU 127 in FIG. 1. In contrast to the GCU 127, the voltage regulator 205 includes a regulator selector 223 that selects one of a DC voltage regulator and an AC voltage regulator based on DC and AC power measurements. The regulator selector 223 may implement logic that determines whether to switch to AC voltage regulation or DC voltage regulation based on the DC and AC power measurements. The regulator selector 223 may be implemented using hardware, software, or a combination of hardware and software. As the regulator selector 223 can be implemented with software, the voltage regulator 205 may include a processor that executes some instructions when selecting one of the AC or DC voltage regulation.

In some examples, the voltage regulator 205 may manage separate DC and AC voltage regulators that are part of the voltage regulator 205. Alternatively, the voltage regulator 205 may receive input signals for both the DC and AC voltage and be a single device that selectively regulates generator 201 (AC voltage) and power converter 203 (DC voltage). In some exemplary implementations, the voltage regulator 205 may receive DC measurements 211 from the DC bus 212 and AC measurements 209 from the generator 201. The controlled excitation to the generator 201 may be represented by control signal 207. The DC measurements 211 may include the DC voltage and the DC current. Similarly, the AC measurements may include the AC voltage and the AC current. During regular operation, the regulator selector 223 may select the DC voltage regulator to functions as the point of regulation for the system 200. As used herein, regular operation refers to the operation of the system 200, when the generator 201 is providing power to a load 213. The regulator selector 223 may monitor the DC and AC measurements to detect no-load, light-load, and transient conditions, e.g., not "regular operation." When the regulator selector 223 detects the no-load/light-load during voltage buildup or steady-state operation, the regulator selector 223 may switch the POR from the DC voltage regulation to the AC voltage regulation. Additionally, the voltage regulator 205 may switch the POR to AC voltage regulation during load transients.

In additional embodiments, the system 200 may include a dynamic break resistor (DBR) unit 217. The DBR unit 217 may include a DBR 216 and an insulated gate bipolar transistor (IGBT) 218. The DBR 216 may be turned on by the IGBT 218 that is controlled by hardware or the voltage regulator under load off conditions. For example, the voltage regulator 205 may control the DBR unit 217 by sending DBR control signals 219 to the DBR unit 217. Additionally, the DBR hardware 218 may provide partial control of the DBR 216, where the DBR hardware control functions together with the voltage regulator 205 to control the operation of the DBR 216. As described above, the DBR unit 217 limits the DC bus overvoltage and brings the DC bus voltage back to steady-state. Additionally, as described above, the voltage regulator 205 may include an FDR 221, which increases the dissipation rate of field energy during load-off transients. Accordingly, the system 200 can overcome the generator voltage instability with the DC POR during voltage buildup under no-load conditions. Also, the system 200 can regulate DC voltage overshoot during full-load to either no-load or light-load transients.

In some embodiments, the function of the voltage regulator 205 (for example the regulator selector 223) may be performed by hardware or through the execution of instructions performed by a processor that receives the various measurements from the system 200. When the voltage regulator 205 includes a processor, the processor may execute portions of the methods described in the present disclosure. For example, the processor and/or other computational devices used within the system 200 may be implemented using software, firmware, hardware, or an appropriate combination thereof. The processor and other computational devices may be supplemented by, or incorporated in, specially designed application-specific integrated circuits (ASICs) or field programmable gate arrays (FPGAs). The processors and other computational devices can also include or function with software programs, firmware, or other computer-readable instructions for carrying out various process tasks, calculations, and control functions used in the methods and systems described herein.

The methods described herein may be implemented or controlled by computer-executable instructions, such as program modules or components, executed by at least the processors or other computing devices. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein may be implemented in software, firmware, or other computer-readable instructions. These instructions are typically stored on appropriate computer program products that include computer-readable media used to store computer-readable instructions or data structures. The computer-readable media may store computer-readable instructions or data structures. Such a computer-readable medium may be available media that can be accessed by a general-purpose or special-purpose computer or processor, or any programmable logic device.

Suitable computer-readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can carry or store desired program code as computer-executable instructions or data structures.

Figure 3:
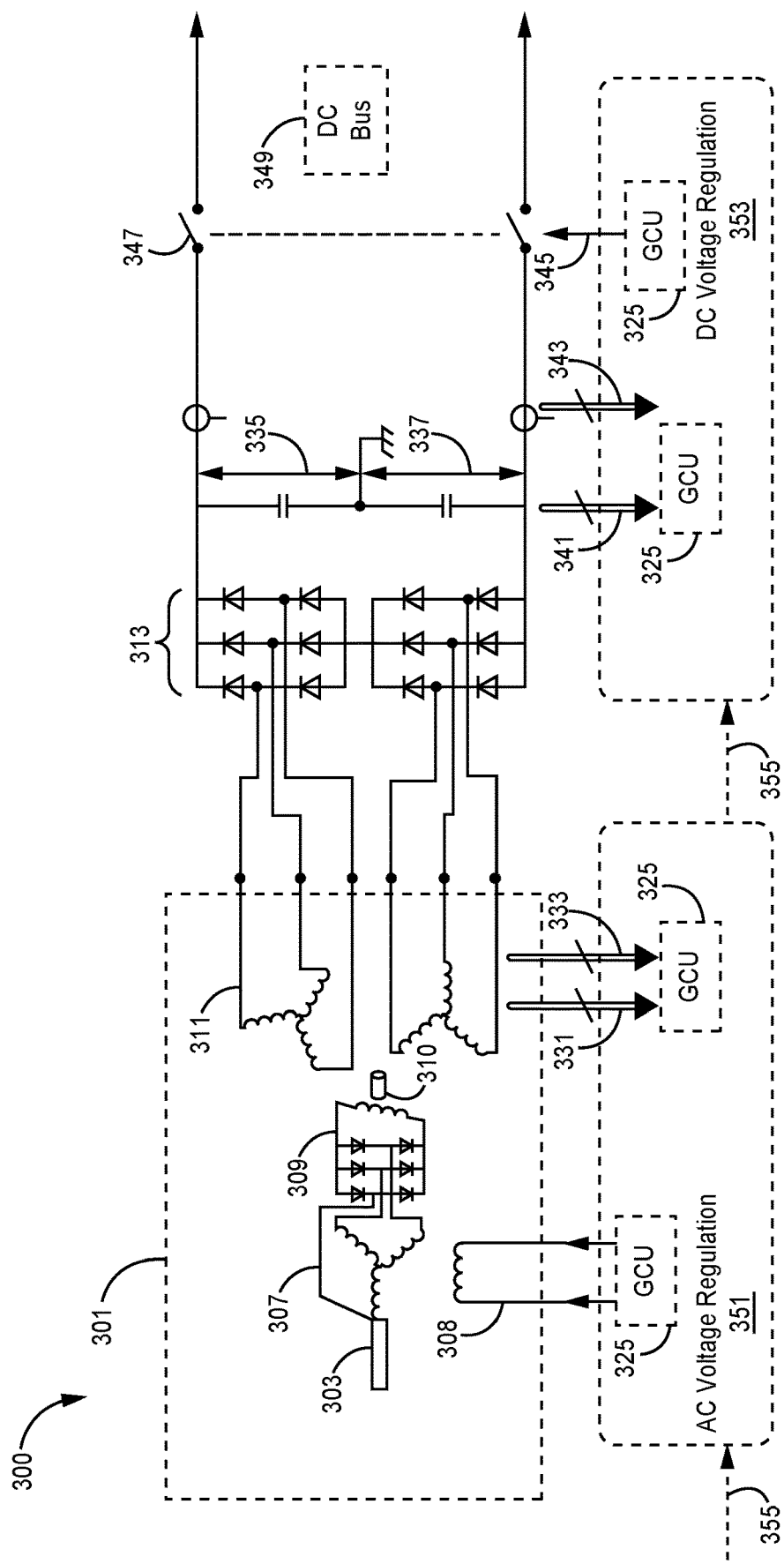
FIG. 3 is a schematic diagram illustrating a system for voltage regulation of a high voltage DC system according to an aspect of the present disclosure.

FIG. 3 is a schematic diagram of a system 300 that switches the POR between DC voltage regulation and AC voltage regulation based on the monitoring of HVDC bus voltages and HVDC bus currents. The system 300 includes a generator system 301. The generator system 301 is similar to the generator system 101 regarding the generation of AC electrical power. However, the generator system 301 may generate six-phase or other number of multi-phase AC electrical power in contrast to the three-phase electrical power generated by the generator system 101 in FIG. 1.

To generate the AC electrical power, the generator system 301 includes a rotor 303 that rotates an exciter 307 in relation to an exciter stator 308. The exciter 307 may function similarly to the exciter 107 in FIG. 1. For example, the exciter 307 may generate three-phase AC electrical power provided to a rectifier assembly 309. The rectifier assembly 309 may function similarly to the rectifier assemblies 109. The rectifier assembly 309 provides DC electrical power for driving a generator rotor 310 that rotates in relation to a generator stator 311. The generator stator 311 may provide AC power as an output of the generator system 301.

In certain embodiments, the generator system 301 provides measurements of the AC generator voltage 331 and an AC generator current 333 to a GCU 325, which functions as an AC voltage regulator. Accordingly, the output of the generator system 301 may function as an input to the AC voltage regulator. The GCU 325 may also provide an excitation field to the exciter stator 308 to control the operation of the exciter 307. Alternatively, DC power can be received through a DC power input 355 to provide the excitation field to the exciter stator 308. In addition to providing the measurements of the AC generator voltage 331 and the AC generator current 333 to the GCU 325, the generator system 301 may also provide AC electrical power to a power converter 313, where the power converter 313 converts the AC voltage to DC voltage.

In exemplary embodiments, after the system 300 converts the AC voltage to DC voltage, the system 300 may provide the DC voltage to a load through a DC bus 349. The DC bus 349 may include a DC bus capacitor or capacitors 335 and 337 that function similar to the DC bus capacitor 215.

Additionally, the DC bus 349 may provide measurements of the DC power to the GCU 325. For example, the DC bus 349 may provide a DC voltage measurement 341 and a DC current measurement 343 to the GCU 325. The GCU 325 may then provide DC power distribution control 345 to the DC bus 349 by controlling an output DC contactor (ODCC) 347. In some implementations, the GCU 325 may include the functionality of the regulator selector (such as the regulator selector 223 in FIG. 2) by selecting either the DC voltage regulation 353 or the AC voltage regulation 351. Additionally, the GCU 325 may also include the functionality for providing the DC voltage regulation 353 and AC voltage regulation 351. Alternatively, the GCU may coordinate the operation of separate devices that provide the DC voltage regulation 353 and the AC voltage regulation 351. DC voltage regulation 353 and the AC voltage regulation 351 can be implemented in the same physical unit.

Figure 4:
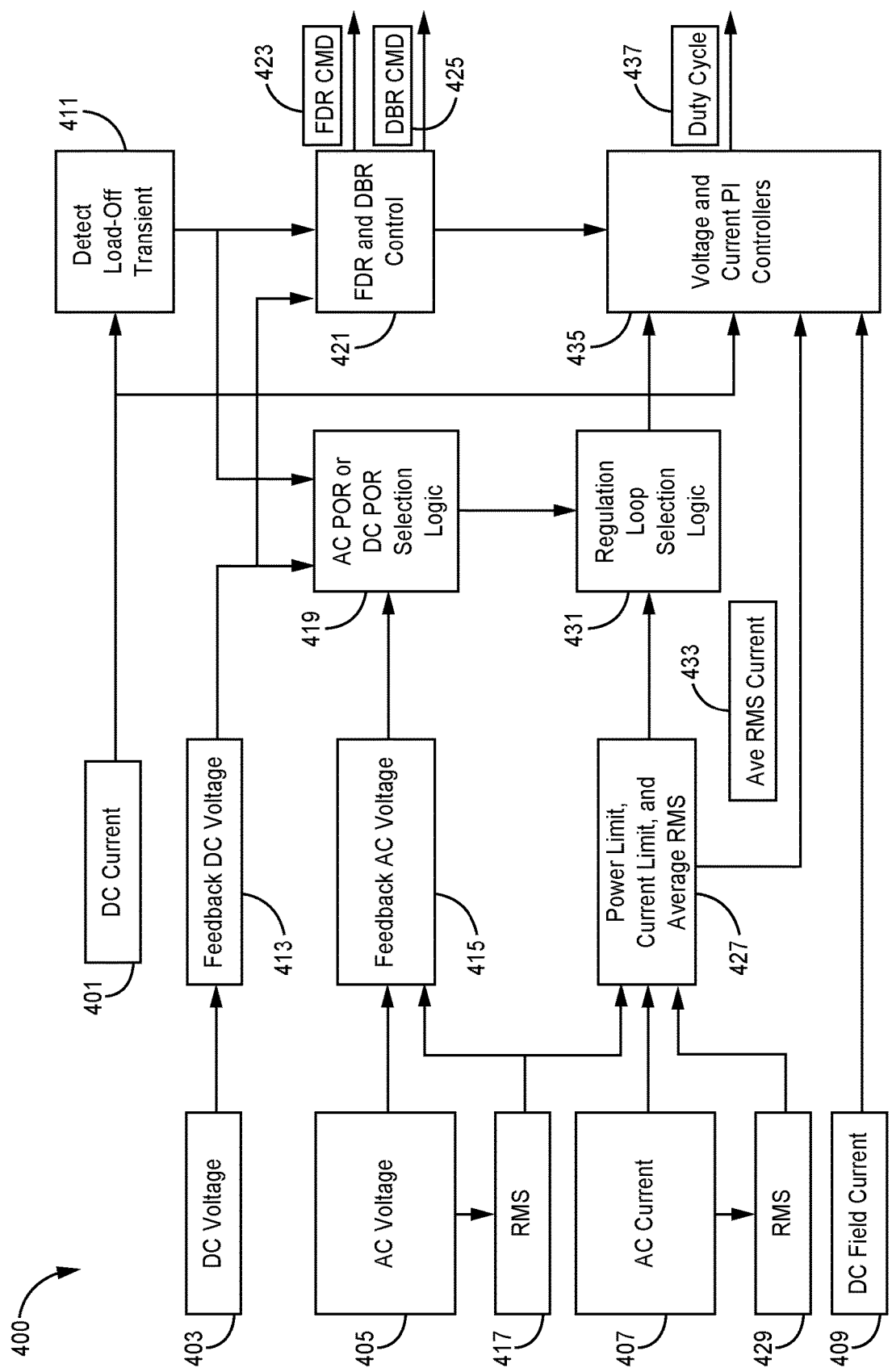
FIG. 4 is a diagram of an algorithm for providing voltage regulation for high voltage DC systems according to an aspect of the present disclosure.

As described above, the GCU 325 may operate in conjunction with a DBR and FDR to provided DC voltage regulation. FIG. 4 is a diagram illustrating a method for power regulation of the systems 200 and 300. As shown, the method 400 receives five inputs when regulating the voltage produced by systems such as the systems 200 and 300. For example, the method 400 receives a DC current 401, a DC voltage 403, an AC voltage 405, an AC current 407, and a DC field current 409. The DC current 401 and the DC voltage 403 are the current and voltage produced by the generator system provided by the system to potentially connected loads. The AC voltage 405 and the AC current 407 are the voltage and current provided by the generator in the generator system before conversion from AC to DC. The DC field current 409 may refer to a DC field current applied to the exciter stator to drive the operation of an exciter.

As shown, the method 400 receives the various inputs and determines how to regulate the voltage between a DC POR and an AC POR. For example, using the DC current 401, the method 400 proceeds at 411, where a load-off transient is detected. Also, using the DC voltage 403, the method 400 proceeds at 413, where DC voltage is fed back to facilitate the DC voltage regulation at the DC POR. For example, the DC voltage regulation may be provided to the GCU, which then regulates the DC voltage. The DC voltage and the outcome of the detection of the load-off transient may be provided to an AC POR or DC POR selection logic at 419.

In exemplary embodiments, the method 400 receives the AC voltage at 415, where the AC voltage is feed back for regulation. For example, when the AC voltage 405 is produced by a six-phase generator, the AC voltage 405 includes six voltage measurements. Accordingly, the method 400 may also calculate a composite value for the six voltage measurements. For example, at 417, the method 400 calculates a root-mean-square (RMS) value for the AC voltages 405. The RMS value 417 may also be provided to the AC voltage feedback 415, where the AC voltage feedback 415 uses the RMS value 417 for regulation of the AC voltage produced by the generator. The AC voltage feedback 415 may be additionally provided to the AC POR or DC POR selection logic 419.

In certain embodiments, the selection logic 419 uses the DC voltage, the detected load-off transient, and the AC voltage feedback to determine whether to regulate the DC voltage or the AC voltage. For example, the selection logic may monitor the AC voltages and the DC bus voltages. When the load-off transient is detected, the selection logic 419 determines that the POR should switch from the DC voltage regulator to the AC voltage regulator. For example, the selection logic 419 determines that there is no load or a light load during a voltage buildup condition and/or steady-state operation and that the GCU should change the POR from the DC voltage regulator to AC voltage regulator. By switching the POR from the DC voltage regulator to the AC voltage regulator, a generator terminal voltage may remain stable without oscillations and maintain a desired AC line-to-line peak voltage during no-load or light-load conditions while improving voltage transients during load-on conditions.

To deal with overshoot, the method 400 proceeds at 421 with controlling an FDR and a DBR. As discussed above, the FDR and DBR may be controlled partly by DBR hardware and partly by a GCU. For example, the FDR and DBR control may receive the output from the load-off transient detection and the feedback DC voltage. From the inputs, the FDR and DBR control may detect an overvoltage and turn on the DBR during a load-off transient. As described above, DBR hardware may include an overvoltage detection circuit during the load-off transient. After the initial operation of the DBR hardware control, the DBR control is taken over by the GCU. For example, after the initial operation of the DBR hardware control, the GCU can produce FDR commands 423 and DBR commands 425 to control the operation of both the FDR and the DBR.

In certain embodiments, the method 400 proceeds at 427, where a power limit, current limit, and average RMS measurements are calculated for the AC power measurements. For example, power limit, current limit, and average RMS measurements are calculated based on the AC current measurements, an RMS value for the AC current, and an RMS value for the AC voltage. The method 400 then proceeds at 431, where a logic selects a regulation loop. For example, using the calculated limits, the average RMS value, and the AC POR or DC POR selection, the system selects the feedback loop in either the AC POR or the DC POR to be regulated.

In exemplary embodiments, the method 400 proceeds at 435, where multiple inputs are provided for use by voltage and current proportional-integral (PI) controllers. For example, the voltage and current PI controllers may receive signals from the regulation loop selection logic, the FDR and DBR control, an average RMS current, and a measurement of the DC field current 409 from the exciter. Using the various inputs, the voltage and current PI controllers may provide a signal having a specific duty cycle 437 that drives the rotation of the generator. The voltage and current PI controllers can then control the voltage and current produced by the generator.

Figure 5:
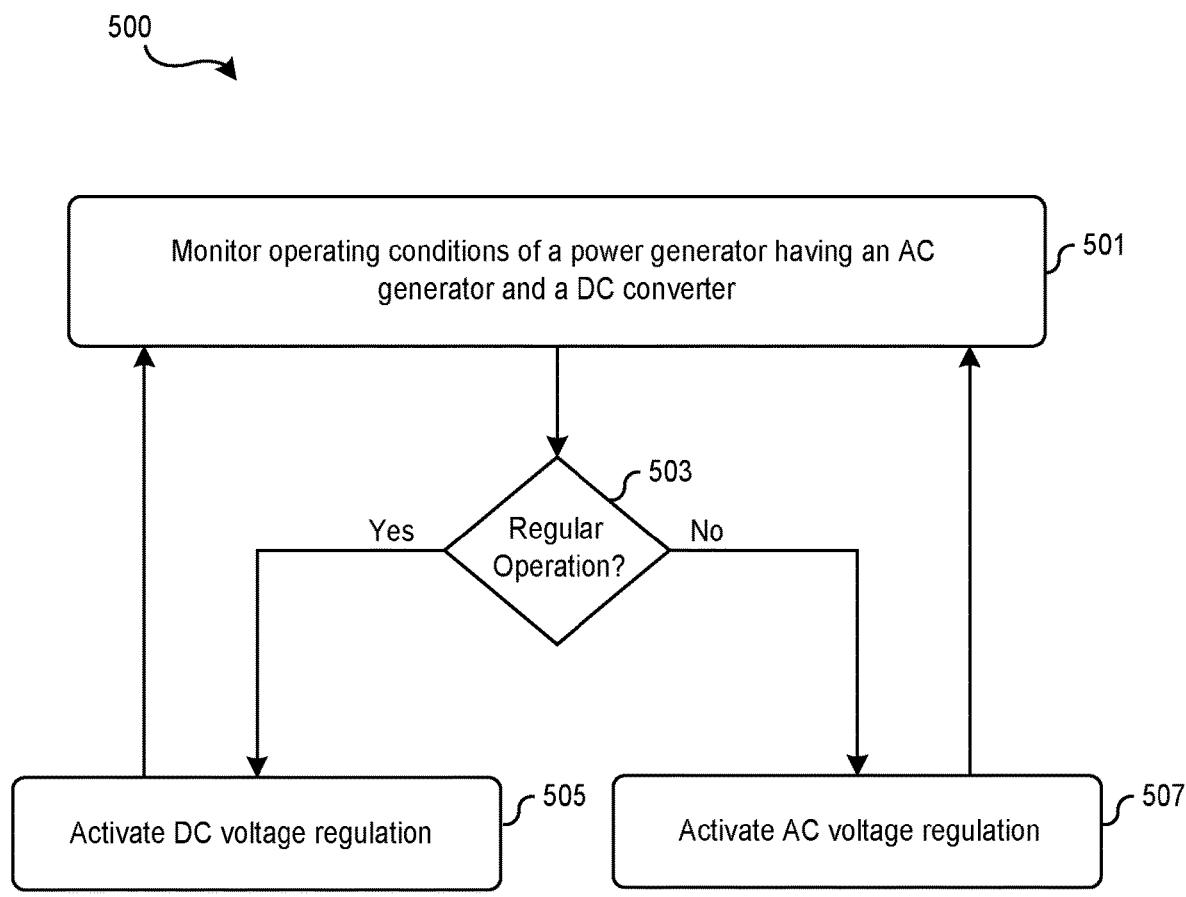
FIG. 5 is a flowchart diagram of a method for providing voltage regulation for high voltage DC systems according to an aspect of the present disclosure.

FIG. 5 is a flowchart diagram of a method 500 for activating either DC voltage regulation or AC voltage regulation for power produced by a generator. Method 500 proceeds at 501, where operating conditions of a power generator having an AC generator and a DC converter are monitored. The method 500 proceeds at 503, it is determined whether the power generator is regularly operating. As described above, the power generator is regularly operating when providing DC power to a load as compared to light-load or no-load operation (or transitions between operative states). When it is determined that the power generator is regularly operating, the method 500 proceeds at 505, where DC voltage regulation is activated. Alternatively, when it is determined that the power generator is not regularly operating, the method 500 proceeds at 507, where AC voltage regulation is activated. Additionally, after activating either the DC voltage regulation or the AC voltage regulation, the method 500 returns to 501 to continue monitoring operating conditions.

EXAMPLE EMBODIMENTS

Example 1 includes a system comprising; a generator that generates alternating current (AC) voltage; a power converter that converts the AC voltage into regulated direct current (DC) voltage; and a voltage regulator comprising: an AC voltage regulator that regulates the AC voltage generated by the generator; a DC voltage regulator that regulates the DC voltage produced by the power converter; and a regulator selector that selectively activates one of the AC voltage regulator and the DC voltage regulator based on a current from the power converter and at least one of a voltage of the generator and a voltage of the power converter.

Example 2 includes the system of Example 1, wherein the regulator selector selectively activates the AC voltage regulator based on a detected no-load condition.

Example 3 includes the system of Example 2, wherein the regulator selector detects the no-load condition based on monitoring the current from the power converter.

Example 4 includes the system of any of Examples 2-3, wherein the voltage regulator regulates the generator AC voltages to a defined reference voltage during a transition from a load-on condition to at least one of the no-load condition and a light load condition.

Example 5 includes the system of any of Examples 1-4, wherein the voltage regulator includes a field dump resistor (FDR) and provides control of a dynamic break resistor (DBR).

Example 6 includes the system of Example 5, wherein operation of the DBR is additionally controlled by DBR hardware and the DBR hardware initially controls the operation of the DBR upon detection of a load-off transient, wherein the control of the DBR passes from the DBR hardware to the voltage regulator.

Example 7 includes the system of any of Examples 1-6, further comprising a high voltage DC bus, wherein the high voltage DC bus provides the DC voltage for use by one or more loads.

Example 8 includes the system of any of Examples 1-7, wherein the voltage regulator is a generator control unit.

Example 9 includes the system of any of Examples 1-8, wherein the voltage regulator regulates the DC voltage during regular operation.

Example 10 includes a method comprising: monitoring operating conditions of a power generator having an AC generator and a DC converter; determining whether the power generator is regularly operating by providing a DC voltage to a load based on a current of the DC bus and at least one of the DC voltage and the AC voltage; when determining that the power generator is regularly operating, activating DC voltage regulation; when determining that the power generator is not regularly operating, activating AC voltage regulation.

Example 11 includes the method of Example 10, wherein determining that the power generator is not regularly operating comprises identifying a no-load condition.

Example 12 includes the method of Example 11, wherein identifying the no-load condition is based on monitoring the current of the DC bus.

Example 13 includes the method of any of Examples 11-12, wherein the AC voltage regulation regulates the value of the AC voltage to a defined reference voltage during a transition from a load-on condition to the no-load condition.

Example 14 includes the method of any of Examples 10-13, further comprising controlling operation of a field dump resistor (FDR) and a dynamic break resistor (DBR).

Example 15 includes the method of Example 14, further comprising controlling the DBR with DBR hardware.

Example 16 includes the method of Example 15, further comprising: initially controlling the operation of the DBR with DBR hardware upon detection of a load-off transient; transitioning control of the DBR to a generator control unit.

Example 17 includes the method of any of Examples 10-16, wherein a generator control unit determines whether the power generator is regularly operating.

Example 18 includes a system comprising: a generator that generates alternating current (AC) voltage; a power converter that converts the AC voltage into regulated direct current (DC) voltage; a DC bus that provides the DC voltage for use by one or more loads; and a voltage regulator comprising: an AC voltage regulator that regulates the AC voltage generated by the generator when the AC voltage regulator is selected; a DC voltage regulator that regulates the DC voltage produced by the power converter when the DC voltage regulator is selected; and a regulator selector that detects at least one of a no-load condition or a light load condition based on the current of the DC bus, wherein the regulator selector selects the AC voltage regulator based on detecting at least one of the no-load condition and the light load condition and selects the DC voltage regulator during regular operation.

Example 19 includes the system of Example 18, wherein the voltage regulator regulates the generator AC voltages to a defined reference voltage during a transition from load-on condition to at least one of the no-load condition and the light load condition.

Example 20 includes the system of any of Examples 18-19, wherein the voltage regulator includes a field dump resistor (FDR) and provides control of a dynamic break resistor (DBR), wherein the DBR is additionally controlled by DBR hardware, and the DBR hardware initially controls the operation of the DBR upon detection of a load-off transient and the control of the DBR hardware passes from the DBR hardware to the voltage regulator.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising;
    a generator that generates alternating current (AC) voltage;
    a power converter that converts the AC voltage into regulated direct current (DC) voltage; and
    a voltage regulator comprising:
        an AC voltage regulator that regulates the AC voltage generated by the generator;
        a DC voltage regulator that regulates the DC voltage produced by the power converter; and
        a regulator selector that selectively activates one of the AC voltage regulator and the DC voltage regulator based on a current from the power converter and at least one of a voltage of the generator and a voltage of the power converter.

2. The system of claim 1, wherein the regulator selector selectively activates the AC voltage regulator based on a detected no-load condition.

3. The system of claim 2, wherein the regulator selector detects the no-load condition based on monitoring the current from the power converter.

4. The system of claim 2, wherein the voltage regulator regulates the generator AC voltages to a defined reference voltage during a transition from a load-on condition to at least one of the no-load condition and a light load condition.

5. The system of claim 1, wherein the voltage regulator includes a field dump resistor (FDR) and provides control of a dynamic break resistor (DBR).

6. The system of claim 5, wherein operation of the DBR is additionally controlled by DBR hardware and the DBR hardware initially controls the operation of the DBR upon detection of a load-off transient, wherein the control of the DBR passes from the DBR hardware to the voltage regulator.

7. The system of claim 1, further comprising a high voltage DC bus, wherein the high voltage DC bus provides the DC voltage for use by one or more loads.

8. The system of claim 1, wherein the voltage regulator is a generator control unit.

9. The system of claim 1, wherein the voltage regulator regulates the DC voltage during regular operation.

10. A method comprising:
    monitoring operating conditions of a power generator having an AC generator and a DC converter;
    determining whether the power generator is regularly operating by providing a DC voltage to a load based on a current of the DC bus and at least one of the DC voltage and the AC voltage;
    when determining that the power generator is regularly operating, activating DC voltage regulation;
    when determining that the power generator is not regularly operating, activating AC voltage regulation.

11. The method of claim 10, wherein determining that the power generator is not regularly operating comprises identifying a no-load condition.

12. The method of claim 11, wherein identifying the no-load condition is based on monitoring the current of the DC bus.

13. The method of claim 11, wherein the AC voltage regulation regulates the value of the AC voltage to a defined reference voltage during a transition from a load-on condition to the no-load condition.

14. The method of claim 10, further comprising controlling operation of a field dump resistor (FDR) and a dynamic break resistor (DBR).

15. The method of claim 14, further comprising controlling the DBR with DBR hardware.

16. The method of claim 15, further comprising:
    initially controlling the operation of the DBR with DBR hardware upon detection of a load-off transient;
    transitioning control of the DBR to a generator control unit.

17. The method of claim 10, wherein a generator control unit determines whether the power generator is regularly operating.

18. A system comprising:
    a generator that generates alternating current (AC) voltage;
    a power converter that converts the AC voltage into regulated direct current (DC) voltage;
    a DC bus that provides the DC voltage for use by one or more loads; and
    a voltage regulator comprising:
        an AC voltage regulator that regulates the AC voltage generated by the generator when the AC voltage regulator is selected;

a DC voltage regulator that regulates the DC voltage produced by the power converter when the DC voltage regulator is selected; and a regulator selector that detects at least one of a no-load condition or a light load condition based on the current of the DC bus, wherein the regulator selector selects the AC voltage regulator based on detecting at least one of the no-load condition and the light load condition and selects the DC voltage regulator during regular operation.

19. The system of claim 18, wherein the voltage regulator regulates the generator AC voltages to a defined reference voltage during a transition from load-on condition to at least one of the no-load condition and the light load condition.

20. The system of claim 18, wherein the voltage regulator includes a field dump resistor (FDR) and provides control of a dynamic break resistor (DBR), wherein the DBR is additionally controlled by DBR hardware, and the DBR hardware initially controls the operation of the DBR upon detection of a load-off transient and the control of the DBR hardware passes from the DBR hardware to the voltage regulator.

\* \* \* \* \*